United States Patent [19]

Mickelson et al.

[11] Patent Number: 4,624,106
[45] Date of Patent: Nov. 25, 1986

[54] PRESSURE-COMPENSATING HYDRAULIC SYSTEM FOR PREVENTING UNAUTHORIZED USE OF A MATERIAL HANDLING IMPLEMENT

[75] Inventors: Roger D. Mickelson, West Burlington; Thomas R. Brown, Yarmouth, both of Iowa

[73] Assignee: J. I. Case Company, Racine, Wis.

[21] Appl. No.: 592,371

[22] Filed: Mar. 22, 1984

[51] Int. Cl.$^4$ .............................................. F16D 31/02
[52] U.S. Cl. ...................................... 60/452; 137/385
[58] Field of Search ................ 60/445, 452, 459, 462, 60/468, 443, 465; 417/218, 222, 214, 212; 91/420, 453; 70/177, 179; 137/385, 384.6; 180/287

[56] References Cited

U.S. PATENT DOCUMENTS

| | | | |
|---|---|---|---|
| 3,406,850 | 10/1968 | Hancox | 60/452 X |
| 3,782,862 | 1/1974 | Cammi | 417/313 |
| 3,995,425 | 12/1976 | Wittren | 60/452 X |
| 4,013,380 | 3/1977 | Pensa | 417/218 |
| 4,087,968 | 5/1978 | Bianchetta | 60/452 X |
| 4,167,855 | 9/1979 | Knapp | 60/465 X |
| 4,360,074 | 11/1982 | Parquet | 180/287 |
| 4,402,339 | 9/1983 | Owens | 137/384.6 |
| 4,545,459 | 10/1985 | Rochman | 180/287 |

*Primary Examiner*—Edward K. Look
*Attorney, Agent, or Firm*—Dressler, Goldsmith, Shore, Sutker & Milnamow, Ltd.

[57] ABSTRACT

A pressure-compensating hydraulic system is disclosed for preventing unauthorized use of an associated material handling implement. The system includes a variable displacement hydraulic fluid pump, and a load-sensing pressure-compensator for varying the output of the pump responsively to the pressurized fluid demands of the system. In order to prevent unauthorized use of the associated implement, the invention contemplates the provision of an override mechanism for negating the demand-responsive characteristics of the system. In this manner, a movable member of the implement, such as one of its stabilizers or its loader bucket, is positioned so as to immobilize the implement, with the member thus maintained in this position since the system will not respond to the demand for pressurized fluid to move the member from this immobilizing condition.

2 Claims, 5 Drawing Figures

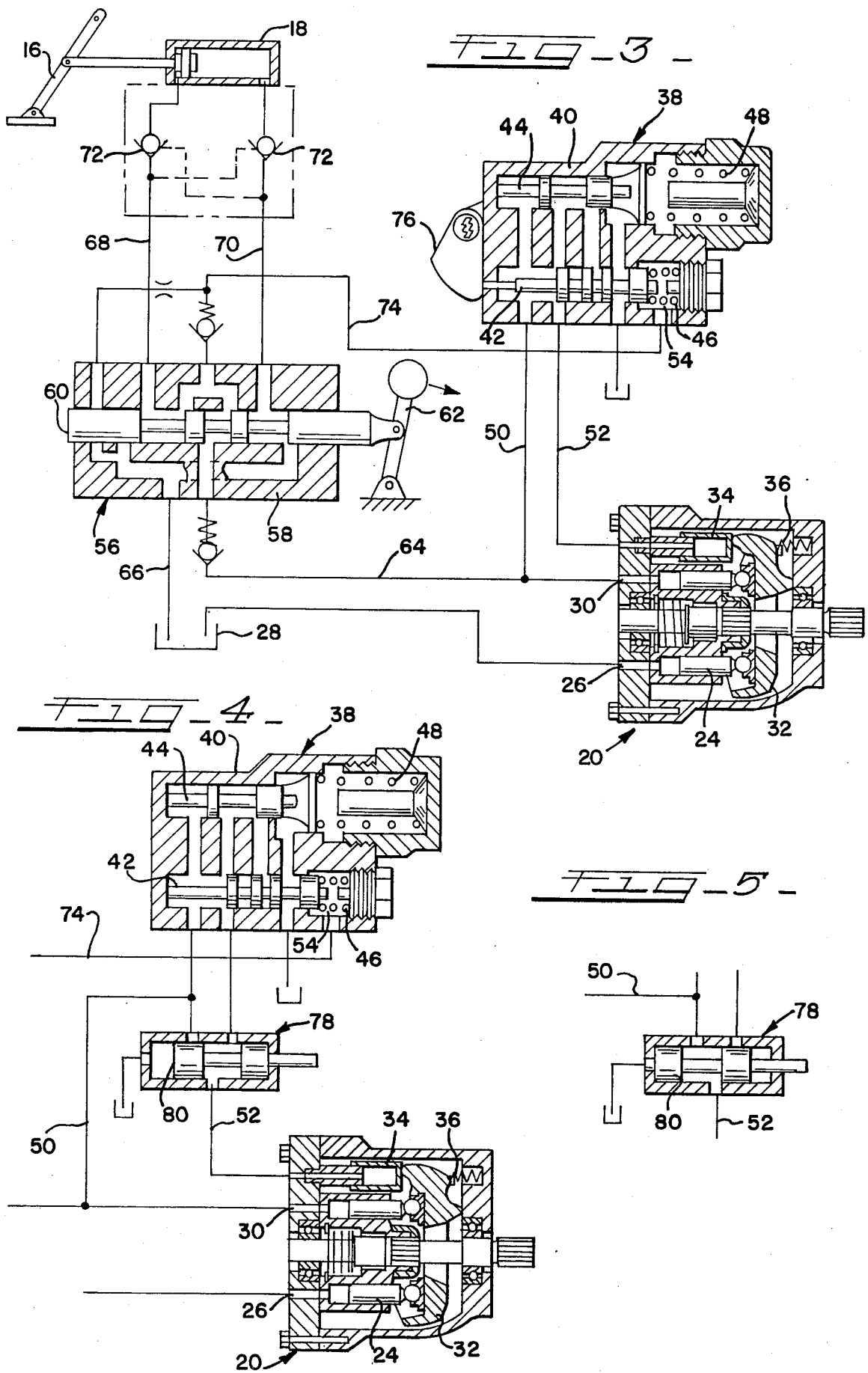

PRESSURE-COMPENSATING HYDRAULIC SYSTEM FOR PREVENTING UNAUTHORIZED USE OF A MATERIAL HANDLING IMPLEMENT

TECHNICAL FIELD

The present invention relates generally to demand-sensing, pressure-compensating hydraulic systems for material handling implements and the like, and more particularly to a pressure-compensating hydraulic system having an arrangement for overriding the demand-sensing mechanism of the system to prevent unauthorized use of the associated implement.

BACKGROUND OF THE INVENTION

Because material handling implements such as tractors, bulldozers, and the like must frequently be left unattended and unguarded at a job site, it is very desirable that such implements incorporate systems to prevent unauthorized operation and to deter theft. Material handling devices generally represent significant capital investment and all reasonable precautions must be taken to prevent the equipment from being operated by vandals or thieves who might gain access to the equipment. While storage of the equipment in suitably locked sheds or garages is of course desirable, structures of this nature are ordinarily not available at a construction or job site, and thus by necessity the equipment must frequently be left relatively unprotected.

While most types of material handling implements include lockable ignition systems for their internal combustion engines to prevent unauthorized operation, it must be recognized that a determined thief might be able to bypass the ignition system lock. Therefore, the present invention contemplates a hydraulic system for such implements which acts to maintain the implement in an immobile state, and thus prevents the implement from being moved even in the event that the engine of the implement is started.

SUMMARY OF THE INVENTION

The present invention contemplates a pressure-compensating hydraulic system for material handling implements or the like for preventing unauthorized use thereof by immobilization of the implement. Pressure-compensating hydraulic systems are very widely used in material handling equipment because of their desirably efficient operating characteristics, which are in large part provided by the demand-responsiveness of such systems. In essence, the present system functions to prevent unauthorized use of the associated implement by providing a selectively lockable mechanism for overriding or defeating the load-sensing, pressure-compensating hydraulic circuitry of the system which normally provides pressurized hydraulic fluid flow in response to system demand. By this arrangement, the stabilizer(s), front-end loader bucket, or one or more like movable members on the implement can be hydraulically positioned for immobilizing the implement. The movable member is then held in this position when the system override has been effected since the system will not respond to the demand for pressurized fluid to move the member from its immobilizing disposition.

The hydraulic system of the present invention includes a variable displacement hydraulic fluid pump such as typically employed in pressure-compensating systems. The pump includes a movable swashplate for varying the effective stroke of the axial pumping pistons of the pump. The pump swashplate is movable from a first relatively low-flow position to a second relatively high-flow position, with the pump including a biasing arrangement for biasing the swashplate toward the second position. The pump further includes a hydraulic pump control piston which acts against the swashplate in opposition to the biasing arrangement for selectively controlling the position of the swashplate, and thus the pressurized fluid output of the pump.

The present system further includes a pressure-compensator hydraulically joined to the pump outlet and the pump control piston. The pressure-compensator includes a sensing arrangement for sensing pressurized fluid demand of an associated hydraulic network of the system whereby the compensator acts to position the movable swashplate of the variable displacement pump by control of fluid pressure in the pump control piston responsively to fluid demand.

The present system further includes an arrangement for overriding the pressure-compensator which, in effect, negates the demand-responsive characteristics of the system. In this manner, the swashplate of the pump is maintained in its first low-flow position upon start-up of the pump when pressurized fluid demand of the associated network of the system increases, thus acting to substantially prevent the supply of pressurized fluid to the associated network.

In the illustrated embodiment of the invention, the associated network of the system to which pressurized fluid is supplied is illustrated in a relatively simplified form as including a hydraulic fluid motor and an operator-positioned directional control valve for selectively directing hydraulic fluid to and from the hydraulic motor. The hydraulic motor is illustrated as operatively connected with a movable member of the associated implement, such as one of its stabilizers. A demand-sensing line operatively connects the directional control valve with the pressure-compensator of the system, with the system normally responding to the demand for pressurized fluid which takes place attendant to stroking of the directional control valve.

Since the pressure-responsiveness of the system is defeated by maintaining the pump swashplate in its low-flow position, it is within the scope of the present invention to provide an arrangement for mechanically locking the swashplate in this position. However, it is presently preferred for economy and reliability that override of the pressure-compensator be achieved by diverting pressurized fluid from the outlet of the pump to the pump control piston for pressurization of the piston in opposition to the swashplate biasing arrangement, thus acting to maintain the swashplate near or in its low-flow position.

In one embodiment of the invention, fluid pressure is diverted from the pump outlet to the control piston via the pressure-compensator, with a releasable locking arrangement operatively associated with the compensator for maintaining it in a condition wherein the pump outlet and pump control piston are joined in fluid communication. This is readily accomplished by the provision of a spool lock operatively associated with one of the first load-sensing and second pressure-compensating valve spools of the compensator for maintaining that one of the valve spools in a position wherein the pump outlet and pump control piston are joined in fluid communication.

In an alternate embodiment, fluid pressure can be selectively diverted from the pump outlet to pump control piston by the provision of a hydraulic lock valve which can be positioned for joining the outlet and control piston in fluid communication.

Numerous other features and advantages of the present hydraulic system will become readily apparent from the following detailed description, the accompanying drawings, and the appended claims.

BRIEF DESCRIPTION OF THE HEADINGS

FIG. 3 is a view similar to FIG. 2 showing the override mechanism of the present hydraulic system in a condition for preventing unauthorized use of the associated implement;

FIG. 4 is a diagrammatic view illustrating an alternate embodiment of the override mechanism of the present hydraulic system; and FIG. 5 is a view similar to FIG. 4 further illustrating the alternate embodiment of the present invention shown in FIG. 4.

DETAILED DESCRIPTION

Figure 1:
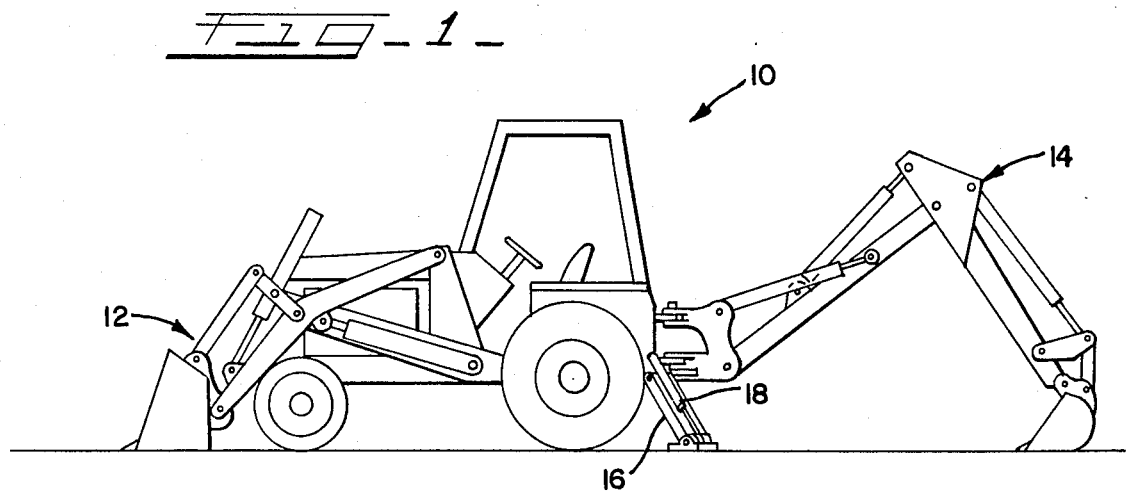
FIG. 1 is a side elevational view of a material handling implement of the type with which the present hydraulic system is suited for use.

While the present invention is susceptible of embodiment in various forms, there is shown in the drawings and will hereinafter be described alternate embodiments of the invention, with the understanding that the present disclosure is to be considered as an exemplification of the principles of the invention and is not of intended to limit the invention to the specific embodiments illustrated.

Referring first to FIG. 1, therein is illustrated a material handling implement, shown as a tractor 10, of the type which typically employs a pressure-compensating hydraulic system for efficient demand-responsive operation of its various components. For purposes of illustration, tractor 10 has been shown as having typical attachments, including a front-end loader 12, and a backhoe 14. Tractor 10 further includes a pair of stabilizers 16 (one being shown) which are extended by operation of respective stabilizer hydraulic motors 18 (one being shown) for immobilizing and supporting the tractor during operation of backhoe 14. As will be recognized by those familiar with the art, full extension of stabilizers 16 or full downward extension of loader 12 (such that the tractor 10 is partially lifted from the ground) acts to immobilize the tractor and essentially precludes it from being driven or otherwise moved. It is immobilization in this manner which the present hydraulic system is adapted to effect and selectively maintain for preventing unauthorized operation of the implement.

Figure 2:
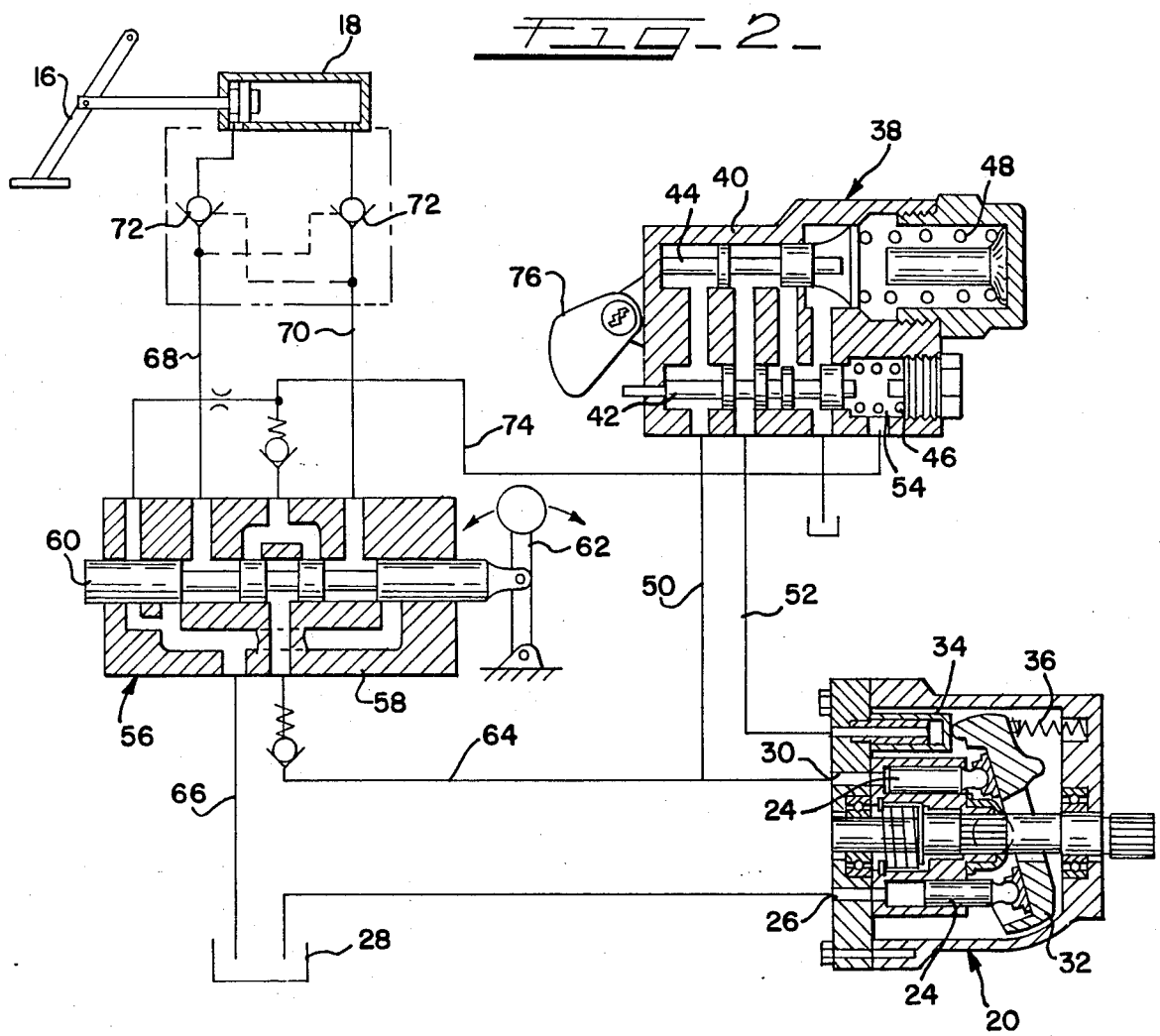
FIG. 2 is a diagrammatic and simplified illustration of a pressure-compensating hydraulic system embodying the principles of the present invention.

FIG. 2 is a diagrammatic illustration of a hydraulic system for tractor 10 embodying the principles of the present invention. For clarity of disclosure, the present pressure-compensating hydraulic system is illustrated in a highly simplified form, since the system would typically include a number of different hydraulic fluid motors, directional control valves and like components. Such a system might also typically include a priority hydraulic valve for prioritizing hydraulic fluid demand, such as for providing priority pressurized fluid flow to the hydraulic steering arrangement of the tractor 10. Accordingly, it is to be recognized that hydraulic systems embodying the present invention can be of widely varying configurations in keeping with the principles disclosed herein.

Pressurized hydraulic fluid for operation of the system is provided by a variable displacement hydraulic fluid pump 20. Pump 20 is typically driven by the internal combustion engine of the associated implement. The pump 20 typically includes a plurality of axially movable pump pistons 24 which act to draw hydraulic fluid through a pump inlet 26 (i.e., the suction side of the pump) from a hydraulic fluid reservoir 28. Pressurized hydraulic fluid is discharged from pump 20 via pump outlet 30 for supply of pressurized hydraulic fluid to the associated network.

The variable displacement characteristics of pump 20 are achieved by the provision of a tiltable, movable, swashplate 32 operatively connected with the pump pistons 24 of the pump. Variable displacement is achieved by selective positioning of swashplate 32 from a first relatively low-flow position (shown in FIG. 3) wherein the swashplate is generally perpendicular to the shaft of the pump and the effective stroke of pump pistons 24 is relatively small, to a second relatively high-flow position wherein the swashplate is maintained at an angle and the effective stroke of pistons 24 is relatively great. FIG. 2 illustrates swashplate 32 in this second position, but it should be noted FIG. 2 illustrates the present system with pump 20 not running. Upon start-up of the pump, the swashplate 32 is quickly moved to its first, low-flow position, and the system is normally ready for demand-responsive operation.

Selective positioning of swashplate 32 is effected by means of a hydraulic pump control piston 34 operatively connected with the swashplate 32. Pump control piston 34 acts in opposition to a biasing arrangement configured to bias the swashplate 32 from its first low-flow position toward its second high-flow position. In the illustrated embodiment, the swashplate biasing arrangement is illustrated as comprising biasing spring 36, but it will be recognized by those familiar with the art that in some applications (such as in relatively large displacement pumps) the biasing action on the swashplate is effected with fluid pressure, sometimes in conjunction with spring biasing such as by spring 36. Thus, selective fluid pressurization of pump control piston 34 results in selective positioning of swashplate 32 in opposition to spring 36 for varying the displacement of the pump 20.

The present hydraulic system further includes a demand-responsive pressure-compensator 38 hydraulically joined to the pump 20. In a typical installation, the compensator 38 would be mounted on or integrated into the housing of the pump 20. While the configuration of compensator 38 may vary depending upon the specific configuration of any given system, the compensator typically includes a body 40 which defines respective bores for a first load-sensing valve spool 42 and a second pressure-compensating valve spool 44. The compensator 38 typically includes a biasing arrangement for urging each of the valve spools 42 and 44 to respective dispositions as illustrated in FIG. 2. Accordingly, a first biasing spring 46 acts against the load-sensing spool 42, and typically has a relatively low spring rate value. A second biasing spring 48 acts against the pressure-compensating spool 44, and is usually configured to provide a substantially higher spring rate value than biasing spring 46.

Compensator 38 is hydraulically joined to pump 20 by way of a passage 50 which hydraulically joins the bores of valve spools 42 and 44 to the outlet 30 of variable displacement pump 20. The bores of valve spools 42 and 44 are further joined to pump 20 via a passage 52 which connects pump control piston 34 with the compensator. A pressure-sensing chamber 54 is defined by the body 40 of the compensator, with pressurization of chamber 54 acting in conjunction with biasing spring 46 to position load-sensing valve spool 42 responsively to the demand for pressurized fluid of the system. By this arrangement, the compensator 38 regulates the pressurization of control piston 34, thus regulating the output of pump 20 by selective positioning of swashplate 32.

FIG. 2 further illustrates a simplified hydraulic network which is supplied with pressurized hydraulic fluid from variable displacement pump 20. The network includes a directional control spool valve 56, which is illustrated as a closed-port, open-center type spool valve. This type of control valve is typically employed in a material handling implement hydraulic system for good operator "controllability" of the implement. The control valve 56 typically includes a valve body 58 which defines a bore within which a valve spool 60 is selectively positionable. A suitable control lever 62 or the like is operatively connected with the valve spool 60, thus accommodating selective positioning of the valve spool by the implement operator. Pressurized hydraulic fluid is supplied to the control valve 56 via conduit 64 from pump outlet 30, with return fluid flow from the valve to fluid reservoir 28 provided by a conduit 66.

In keeping with the principles of the present invention, directional control valve 56 is shown as being operatively associated with the hydraulic motor 18 which selectively positions one of the stabilizers 16 of tractor 10. To this end, a pair of conduits 68 and 70 respectively join the control valve 56 and the stabilizer motor 18 with each other for direction of hydraulic fluid to and from the motor. In this regard, a pair of pilot-operated check valves 72 are preferably respectively provided in the conduits 68 and 70 such that pressurization of one of the conduits by appropriate positioning of control valve 56 acts to open the other of the conduits for return fluid flow from the motor 18. The provision of check valves 72 prevents movement of motor 18 and its associated stabilizer 16 unless pressurized fluid is being supplied to the motor. As indicated in phantom line, check valves 72 are preferably an integral part of the motor 18 itself, thus preventing bypass of the check valves by failure of one of conduits 68 or 70.

In order to provide the compensator 38 of the system with suitable hydraulic signals reflective of system demand for pressurized fluid, a load-sensing line 74 operatively connects the directional control valve 56 with the load-sensing chamber 54 of the compensator. By this arrangement (which while illustrated in its simplified form typifies the configuration of most load-sensing systems), the compensator 38 functions to control the output of pump 20 by controlling the pressurization of pump control piston 34. Thus, when directional control valve 56 is stroked by manipulation of control lever 62 for operation of motor 18, the output of pump 20 is increased to meet the demand for pressurized hydraulic fluid. When the load against which the motor 18 is working has been overcome, or when the spool 60 of control valve 56 is positioned in its neutral position (as shown in FIG. 2), compensator 38 senses the decrease in demand for pressurized fluid and responsively positions swashplate 32 in its first low-flow position by pressurization of control piston 34. Thus, during normal demand-responsive of operation of the system, the compensator 38 "tailors" the output of variable displacement pump 20 to system load.

As will be appreciated, the operation of hydraulic motor 18 will not be effected attendant to operation of control valve 56 unless sufficient pressurized fluid is being supplied by the pump 20 for opening check valves 72. Thus, the present hydraulic system contemplates an arrangement for maintaining swashplate 32 near or in its low-flow position when system demand would otherwise result in re-positioning of the swashplate for increase of pressurized fluid flow. In essence, the present system permits selective override of the compensator 38 which acts to negate the normal demand-responsiveness of the system. In this manner, unauthorized use of tractor 10 is prevented by immobilization of the tractor by positioning stabilizer 16 (or a like movable member) in a position wherein the tractor is immobilized, and thereafter preventing supply of pressurized fluid to the stabilizer motor 18 even if directional control valve 56 is stroked.

As will be appreciated, demand-responsive operation of variable displacement pump 20 is prevented by maintaining the swashplate 32 at or near it first low-flow position. While a mechanical locking arrangement can be provided in operative association with the swashplate for selectively locking it in or at its low-flow position, it is presently preferred that the swashplate be held in its low-flow position by diverting pressurized fluid flow from pump outlet 30 to the hydraulic pump control piston 34, thus overriding compensator 38. This is readily accomplished in accordance with the different embodiments of the present invention.

In the embodiment of the invention illustrated in FIGS. 2 and 3, pressurized hydraulic fluid from pump outlet 30 is diverted to control piston 34 by maintaining compensator 38 in a condition wherein the pump outlet 30 and the control piston 34 are joined in fluid communication. To this end, a load-sensing spool lock 76 is provided in operative association with first load-sensing valve spool 42 of compensator 38. While it will be recognized that the lock 76 can be of different configurations, the lock functions to maintain the load-sensing spool 42 in a disposition opposing its respective biasing spring 46 to thus provide communication via the compensator body 40 between passage 50 communicating with the pump outlet and passage 52 to the control piston 34. This operative condition of compensator 38 is illustrated in FIG. 3. As will be appreciated, the lock 76 negates the demand-responsiveness of the system, and thus substantially prevents the supply of pressurized fluid to directional control valve 56 upon start-up of the pump, even if the control valve 56 is moved from its neutral position (such as illustrated in FIG. 3). Thus, the absence of sufficient pressurized fluid from pump 20 for operation of stabilizer motor 18 prevents the stabilizer 16 from being moved from it immobilizing disposition, with the pilot-operated check valves 72 preventing movement of the stabilizer 16 even if one of conduits 68 and 70 is severed.

Although not illustrated, it will be readily appreciated that the spool lock 76 can instead be operatively associated with the second pressure-compensating valve spool 44 of compensator 38 rather than first spool 42. In such a modified embodiment, the valve spool 44 is also held by a spool lock such as 76 in a position in opposition to its respective biasing spring 48 (with the valve spool 42 maintained in the position shown in FIG. 2 by its spring 46) to provide fluid communication between passage 50 and 52, thus joining the outlet of pump 20 with the pump control piston 24.

Spool lock 76 is preferably mounted on the compensator 38, or the typical common housing for the compensator 38 and the pump 20. A suitable tumbler lock, code-operated electrical solenoid or special tool or key fitting is preferably provided for maintaining spool lock 76 in its locking condition with respect to one of the compensator valve spools 42 and 44. As will be recognized, such an arrangement provides a highly effective theft deterent since even if the engine of the tractor is started, its hydraulic system cannot be operated so as to permit the implement to be moved. As will be further appreciated, this highly effective system is straightforward in design and can be readily incorporated in an existing pressure-compensating hydraulic system.

FIGS. 4 and 5 illustrate an alternate embodiment of the present invention wherein a lock valve 78 is provided for selectively joining pump outlet passage 50 with control piston passage 52. Lock valve 78 is illustrated as comprising a spool valve including spool 80, with the valve hydraulically joined to pump outlet 30 via passage 50, compensator 38, and control piston 34 via passage 52. The lock valve 78 is movable from a first position, illustrated in FIG. 4, wherein the pump control piston 24 is joined to the compensator 38 and is isolated from the pump outlet for normal demand-responsive operation of the system. The spool 80 of the valve 78 is selectively movable to a second position, shown in FIG. 5, wherein the control piston 34 is hydraulically joined via passages 50 and 52, to the pump outlet 30 for pressurization of the control piston to prevent movement of the swashplate 32 from its first low-flow position by biasing spring 36. The lock valve 78 is preferably equipped with a suitable tumbler lock or code-operated solenoid, or alternately is preferably configured to require a special tool or key for selective positioning thereof.

Thus, the unique manner in which the present hydraulic system effects theft deterence will be readily appreciated. While the present invention has been illustrated as configured for effecting immobilization of tractor 10 by preventing operation of stabilizer motor 18, like immobilization can also be effected by preventing operation of the hydraulic motors which position loader bucket 12. The straightforward nature of the system desirably permits its use in a wide range of different material handling implements, and also readily permits an existing pressure-compensating system to be modified in accordance with the teachings herein.

From the foregoing, it will be observed that numerous modifications and variations can be effected without departing from the true spirit and scope of the novel concept of the present invention. It will be understood that no limitation with respect to the specific embodiments illustrated herein is intended or should be inferred. It is, of course, intended to cover by the appended claims all such modifications fall within the scope of the claims.

What is claimed:

1. A pressure-compensating hydraulic system for preventing unauthorized use of an associated material-handling implement, comprising:

variable displacement fluid pump means having movable swashplate means for varying the fluid flow from an outlet of said pump means by movement of said swashplate means from a first relatively low-flow position to a second relatively high-flow position, means for biasing said swashplate means toward said second position, and hydraulic pump control means for acting against said swashplate in opposition to said biasing means for controlling the position of said swashplate means;

pressure-compensating means hydraulically joined to said pump means outlet and said hydraulic pump control means, said compensating means including means for sensing pressurized fluid demand of said system whereby said compensating means acts to position said swashplate means by control of fluid pressure in said pump control means responsively to fluid demand;

hydraulic motor means mounted on said implement in operative association with a movable member of said implement so that selective fluid pressurization of said motor means moves said member to a position wherein said implement is immobilized;

directional control valve means hydraulically joined with said pump means outlet and said hydraulic motor means for selectively directing pressurized fluid to and from said motor means; and means for overriding said compensating means comprising selectively operable lock valve means hydraulically joined to said pump means outlet, said lock valve means being movable from a first position wherein said pump control means is hydraulically joined to said compensating means for normal demand-responsive operation of said system, to a second position for joining said pump means outlet in fluid communication with said pump control means for diverting pressurized fluid from said outlet to said pump control means for pressurization thereof in opposition to said biasing means to thereby maintain said swashplate means in said first low-flow position thereof when pressurized fluid demand for operation of said hydraulic motor means increases to substantially prevent the supply of pressurized fluid to said directional control valve means for operation of said motor means so that said movable member of said implement can be maintained in position for immobilizing said implement.

2. A pressure-compensating hydraulic system in accordance with claim 1, including pilot-operated check valve means hydraulically joining said motor means and said directional control means for preventing movement of said movable member unless said motor means is pressurized with fluid supplied from said directional control valve means.

* * * * *